United States Patent
Dov et al.

(10) Patent No.: US 7,204,663 B2
(45) Date of Patent: Apr. 17, 2007

(54) MULTI-PURPOSE END-MILL

(75) Inventors: Avi Dov, Ma'alot (IL); Vladimir Volokh, Ma'alot (IL)

(73) Assignee: Hanita Metal Works Ltd., Shlomi Industrial Areas (IL)

( * ) Notice: Subject to any disclaimer, the term of this patent is extended or adjusted under 35 U.S.C. 154(b) by 0 days.

(21) Appl. No.: 11/322,247

(22) Filed: Jan. 3, 2006

(65) Prior Publication Data

US 2006/0110225 A1    May 25, 2006

Related U.S. Application Data

(63) Continuation of application No. 10/469,768, filed as application No. PCT/IL02/00162 on Mar. 3, 2002, now abandoned.

(30) Foreign Application Priority Data

Mar. 5, 2001    (IL) .................................... 141828

(51) Int. Cl.
*B23C 5/10*    (2006.01)
*B23C 51/00*    (2006.01)

(52) U.S. Cl. .............................. 407/53; 407/56; 407/60
(58) Field of Classification Search ................ 407/49, 407/30, 53, 54, 56, 59, 60
See application file for complete search history.

(56) References Cited

U.S. PATENT DOCUMENTS

| 4,810,136 | A | * | 3/1989 | Paige ........................... 407/54 |
| 5,193,944 | A | * | 3/1993 | Nishimura ................... 407/53 |
| 5,221,163 | A | * | 6/1993 | Nishimura ................... 407/53 |
| 5,323,823 | A | * | 6/1994 | Kopras ....................... 144/219 |
| 6,007,276 | A | * | 12/1999 | Wardell ....................... 407/54 |
| 6,164,876 | A | * | 12/2000 | Cordovano ................. 407/59 |
| 6,899,494 | B2 | * | 5/2005 | Walrath ....................... 407/54 |

* cited by examiner

*Primary Examiner*—Willmon Fridie, Jr.
(74) *Attorney, Agent, or Firm*—Nils H. Ljungman & Associates

(57) ABSTRACT

A multi-purpose end-mill to be used for different machining purposes, in particularly useful for closed or open contours machining. The end-mill comprises a cylindrical shank portion connected to a first cutting portion provided with a plurality of spaced-apart cutting teeth and a second portion provided with a plurality of different spaced-apart cutting teeth.

20 Claims, 2 Drawing Sheets

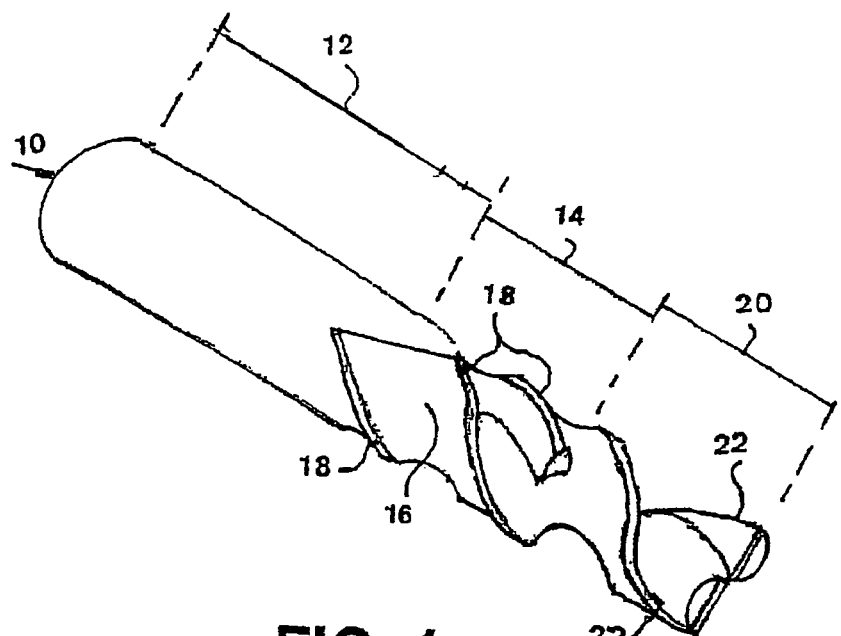
FIG. 1
FIG. 2
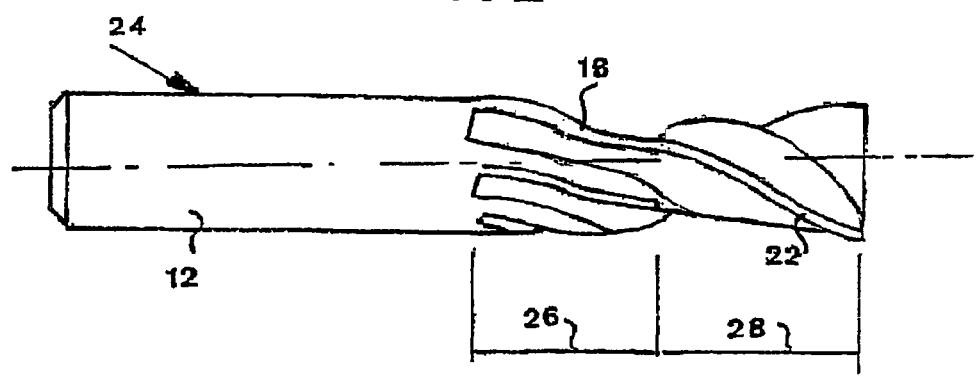
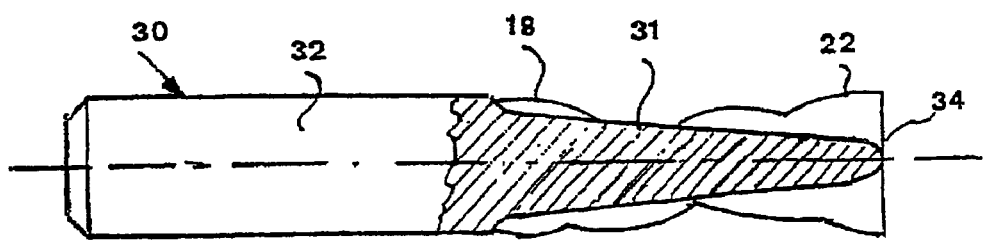
FIG. 3

MULTI-PURPOSE END-MILL

CROSS-REFERENCE TO RELATED APPLICATIONS

This application is a continuation of U.S. patent application No. 10/469,768, filed Sep. 4, 2003 now abandoned, which is hereby incorporated by reference, which is a National Phase Application of PCT International Application No. PCT/IL2002/000162, International Filing Date Mar. 3, 2002, which has been published as WO 2002/070181, International Publication Date Sep. 12, 2002, entitled Multi-Purpose End-Mill, claiming priority of Israeli Patent Application, 141828, filed Mar. 5, 2001.

FIELD AND BACKGROUND OF THE INVENTION

The present invention relates to the machining of slots by use of a rotational cutting tool. More particularly, the invention provides an end mill, which can be used for different machining purposes by changing the distance between a thin workpiece and the end mill shank. This change is accomplished either by moving the workpiece or the cutter.

A common requirement is to machine a slot, straight or contoured, in a thin workpiece. "Thin" means that the machined item is usually no thicker than the tool diameter.

If the required slot reaches an outer edge of the workpiece, or the operation to be carried out comprises machining the outer edge, then the first operation is rough machining, leaving a little material for finishing, and the following operation is finish machining to the required size.

End-mills configured for rough machining are generally unsuitable for finish machining. During rough machining much material is removed, and the removal of chips from the cutting area requires adequate space between cutting teeth. Such space can only be provided when the number of teeth is low, typically 2–4 teeth depending on cutter diameter, and the core diameter of the tool is small, although still large enough to prevent tool breakage. The smaller core diameter may lead to minor loss of accuracy due to tool bending under pressure, but this is of little moment for roughing operations.

Conditions for finish machining are quite different. A larger number of teeth will produce a smoother finish, and as only small quantities of material are removed, little space is needed between teeth for chip clearance. Accuracy of cut is essential for finishing operations, and therefor a large core diameter is desirable to provide the necessary tool rigidity to produce smooth and accurate surfaces. In choosing an appropriate core diameter, there is always a need to balance the requirements of chip clearance and coolant access on the one hand, which call for a small core diameter, and the demand for tool rigidity and break resistance which require a large core diameter.

According to the recommendation of. The Cincinnati Milling Machine Co., no more than two teeth at a time should be engaged in a cut. This rule corresponds well with our previous remarks. During roughing fewer teeth are preferred as the cut is deep; during finishing more teeth are desirable as the cut is shallow.

There are further differences between roughing and finishing tools. The ideal tooth helix angle of an end-mill is partly dependent on the number of teeth. A roughing cutter having few teeth (2–3) requires a large helix angle (about 25°) to reduce vibration. However a finishing cutter having more closely spaced teeth will produce a better finish with a more moderate helix angle; 10° is usual.

For these reasons the tool should be changed after completing the roughing cut and before starting the finishing operation and changed again for the roughing operation on the next workpiece. This is tiresome when done by hand, and still time consuming even when carried out by an automatic machine. The alternative is to complete all roughing cuts on all the workpieces, and then carry out the finish machining on the whole batch. This method however involves clamping and unclamping each workpiece, and aside from the time needed for this, there is greater risk of inaccuracy as a result of the workpieces not being clamped with the same force each time, or as a result of a chip lodged between the workpiece and a locating surface of the fixture or machine vice or table.

If the required slot does not reach an outer edge, then the first operation is drilling a hole to allow entry for the end-mill. Many end-mills are provided with cutting teeth at the end face of the tool and it is possible to use such an end-mill for drilling. However such operation requires high pressure, machining time is extended and the hole produced could be oversize or even off its intended position. A drill can be used to produce the hole, but of course this involves more changeover time. After the hole is drilled, the slot is rough machined and then finish machined as described above.

In U.S. Pat. No. 4,411,563 Moon discloses an end mill provided more thin one set of cutting teeth for the purpose of forming a plurality of steps at the closed extremity of a bored hole. Although the proposed cutting tool will carry out several machining tasks, there is no separate provision for rough and finish machining.

The same remark applies to the double diameter boring tool disclosed by Ashbaugh et al. in U.S. Pat. No. 4,793,745. The tool produces a bore with a stepped diameter at its closed end.

OBJECTS OF THE INVENTION

It is therefore one of the objects of the present invention to obviate the disadvantages of prior art cutting tools and to provide an end mill which can be used for several needed different machining operations in a workpiece that is thin relative to the cutter tool diameter.

It is a further object of the present invention to save most of the time needed for cutter changing by use of a multi-purpose tool which executes different tasks in response to movement of the work table or the cutter spindle.

SUMMARY OF THE INVENTION

The present invention achieves the above objects by providing a multi-purpose end-mill particularly useful for closed contour machining and usable for at least rough machining and finish machining, comprising a cylindrical shank portion to be gripped in a machine tool, said shank portion being connected to a first cutting portion comprising a core supporting a plurality of spaced-apart cutting teeth for a first type of machining, said first cutting portion being connected to a second cutting portion provided with a plurality of spaced-apart cutting teeth for a second type of machining.

In a preferred embodiment of the present invention there is provided a multi-purpose end-mill wherein said first type of machining is finishing, and said second type of machining is roughing.

In a most preferred embodiment of the present invention there is provided a multi-purpose end-mill further provided with a drill-like pointed cutting tip.

Yet further embodiments of the invention will be described hereinafter.

The cutter of the present invention can used for machining most metals, including stainless steel and high temperature alloys such as Inconel 718 and Rene 41. As with prior-art milling cutters, tooth clearance angle is about 4 degrees for hard materials, 6 degrees for softer metals and about 11 degrees for easy-to-machine materials. Rake angles (for a high speed steel cutter) are about 10 degrees for machining hard materials and up to 25 degrees for magnesium, aluminium and plastics.

It will be understood that, as with prior art cutters, the present tool, typically made of high speed steel, can be made partly of tungsten carbide where production quantities justify the cost. Also, coolant passages can be provided in the tool, as is sometimes found on prior art cutters.

SHORT DESCRIPTION OF THE DRAWINGS

The invention will now be described further with reference to the accompanying drawings, which represent by example preferred embodiments of the invention. Structural details are shown only as far as necessary for a fundamental understanding thereof. The described examples, together with the drawings, will make apparent to those skilled in the art how further forms of the invention may be realized.

In the drawings:

FIG. 1 is a perspective view of a preferred embodiment of the end mill according to the invention;

FIG. 2 is an elevational view of an embodiment wherein the tooth helix angle is different for each part of the cutter;

FIG. 3 is a partly sectioned elevational view of an embodiment having a parabolically shaped core;

DETAILED DESCRIPTION OF THE INVENTION

Figure 5:
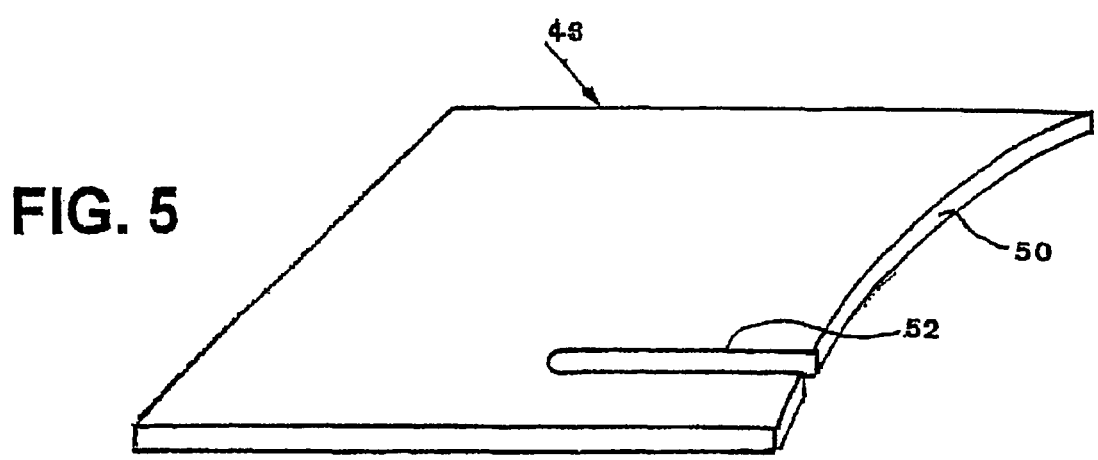
FIG. 5 is a perspective view of a workpiece produced by an end mill of the type seen in FIG. 2.

There is seen in FIG. 1 a multi-purpose end-mill 10 particularly useful for open contour machining, for example producing a workpiece of the type seen in FIG. 5. The end mill 10 is suitable for both rough machining and finish machining.

A cylindrical shank portion 12 is arranged to be gripped in a machine tool (not shown), such as a router or a milling machine, and in some types of work even a lathe or drilling machine.

The shank portion 12 is connected to a first cutting portion 14 comprising a core 16 supporting a plurality of spaced-apart cutting teeth 18 for a first type of machining.

The first cutting portion 14 is connected to a second cutting portion 20 provided with a plurality of spaced-apart cutting teeth 22 for a second type of machining.

Advantageously from considerations of core support diameter, the first type of machining is finishing, and the second type of machining is roughing. This is the arrangement in the shown embodiment. However, if special considerations so warrant, this order can be reversed.

Preferably the first cutting portion 14, which is the finishing portion has a larger number of teeth than the second cutting portion 20 which is the roughing portion. Conveniently the finishing portion 14 has double the number of teeth, for example 4 in the present embodiment, than the roughing portion 20 which has 2 teeth 22.

If a vertical axis milling machine is being used, movement in the Z axis to change between roughing and finishing can be accomplished by raising/lowering the work table, or it may be more convenient to raise/lower the cutter spindle.

If a horizontal axis milling machine is being used, the machine table is moved in the Y axis to change between roughing and finishing.

With reference to the rest of the figures, similar reference numerals have been used to identify similar parts.

FIG. 2 illustrates a multi-purpose end-mill 24 similar to 10 seen in the previous figure. However the finishing portion 26 has a smaller helix angle than the roughing portion 28. Tooth helix angle of an end-mill is partly dependent on the number of teeth; the following values are however typical. The roughing portion 28 has a tooth helix angle of about 25° to reduce vibration. The finishing portion 26 has a more moderate helix angle of about 10° to produce a smooth finish.

Seen in FIG. 3 is a multi-purpose end-mill 30 wherein the core 31 diameter, seen shaded, of the end-mill varies parabolically along the axial length, the larger diameter being located near the shank 32 and the smaller diameter being located near the tool tip 34. This form is ideal for resisting the bending moment in an end-loaded cantilever beam, a model approximately representing the bending stress on the end mill during use.

Figure 4:
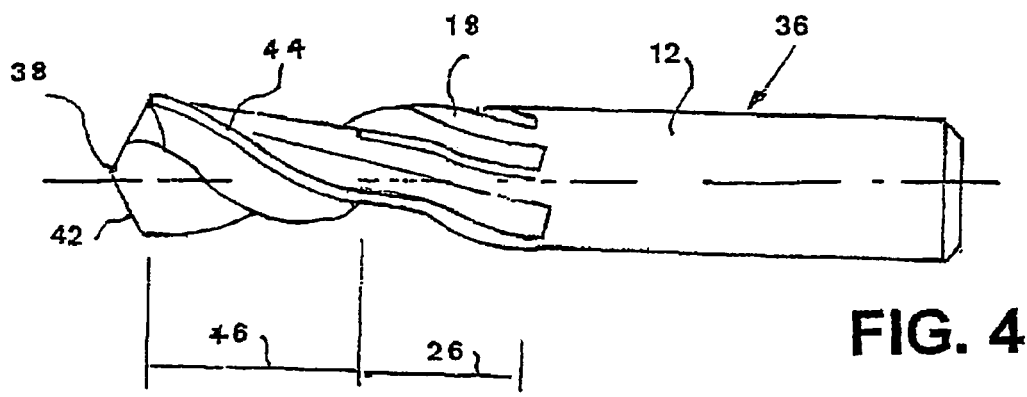
FIG. 4 is similar to FIG. 2, with the addition of a drill point.

Referring now to FIG. 4, there is depicted a multi-purpose end-mill 36 further provided with a drill-like pointed cutting tip 38. The tip 38 enables quick and accurate drilling of a hole at any desired point (usually an end point) of a profile path to be milled. The hole is needed to allow cutter access for rough milling of a slot 40 of the type seen in FIG. 6.

In the shown embodiment, the number (2) of cutting teeth 42 at the pointed cutting tip 38 corresponds to the number (2) of teeth 44 in the second cutting portion 46. The advantage therein is that the tip cutting edges 42 are well supported and that there are unobstructed paths for chip clearance between the teeth 44.

FIG. 5 shows a machined workpiece 48 having one edge machined as a concave curve 50 and having a slot 52 meeting the curve 50. Both the slot 52 and the curve 50 have been rough and finish machined by the multi-purpose end-mill 24 in FIG. 2.

Figure 6:
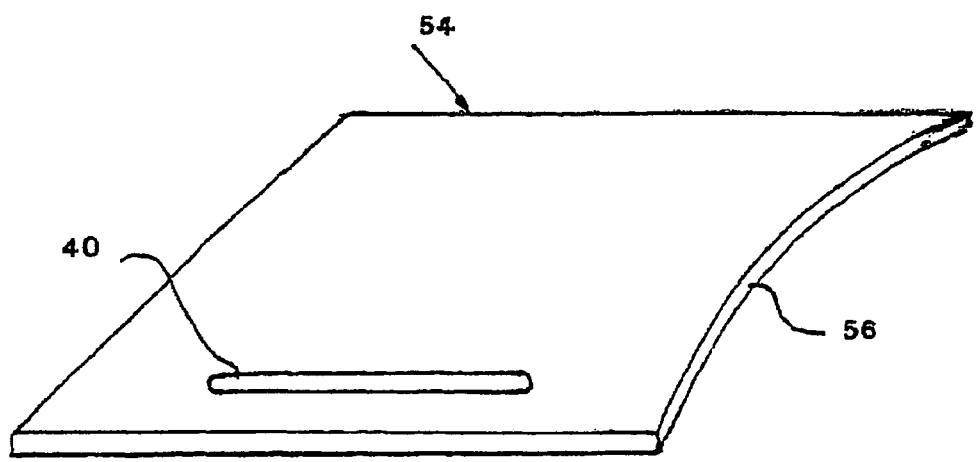
FIG. 6 is a view of a perspective view of a workpiece produced by an end mill of the type seen in FIG. 4

FIG. 6 illustrates a machined workpiece 54 having one edge machined as a concave curve 56. The closed path slot 40 required three machining operations—drilling, rough machining and finishing. All machining was completed by use of the multi-purpose end-mill 36 provided with a drill-like pointed cutting tip 38 seen in FIG. 4, without changing the tool.

The scope of the described invention is intended to include all embodiments coming within the meaning of the following claims. The foregoing examples illustrate useful forms of the invention, but are not to be considered as limiting its scope, as those skilled in the art will readily be aware that additional variants and modifications of the invention can be formulated without departing from the meaning of the following claims.

We claim:

1. An end mill comprising:
   a shank portion being configured to be gripped in a tool;
   a cutting portion having a central longitudinal axis;
   said cutting portion comprising:
      a central core portion;

a first cutting section being configured to perform a finishing machining;
said first cutting section being connected to said shank portion;
said first cutting section comprising:
a plurality of cutting edges being disposed to project from said central core portion; and
a plurality of flutes disposed adjacent their corresponding cutting edges;
a second cutting section being configured to perform a rough machining;
said second cutting section being connected to said first cutting section;
said first cutting section being disposed between said shank portion and said second cutting section along the central longitudinal axis;
said second cutting section comprising:
a plurality of cutting edges being disposed to project from said central core portion; and
a plurality of flutes disposed adjacent their corresponding cutting edge portions;
each of said plurality of cutting edges of said first cutting section being disposed a first distance from said central longitudinal axis;
each of said plurality of cutting edges of said second cutting section being disposed a second distance from said central longitudinal axis;
said first distance being greater than said second distance;
said first cutting section having a larger number of cutting edges and flutes than said second cutting section;
said flutes in said second cutting section having a total cross-sectional area being sufficiently large to permit removal of chips during rough machining;
said flutes in said first cutting section having a total cross-sectional area being sufficiently large to permit removal of chips during finishing machining; and
the total cross-sectional area of said flutes in said second cutting section being substantially greater than the total cross-sectional area of said flutes in said first cutting section.

2. The end mill according to claim 1, wherein said central core portion and said cutting edges of said first cutting edge portion are configured to provide said first cutting edge portion with a greater rigidity than said second cutting edge portion.

3. The end mill according to claim 2, wherein:
said first cutting section has double the number of cutting edges and corresponding flutes than said second cutting section
said cutting portion comprises a first end adjacent said shank portion and a second end opposite said first end; and
the diameter of said central core portion decreases along the central longitudinal axis from said first end to said second end.

4. The end mill according to claim 3, wherein the cross-sectional profile of said central core portion along the central longitudinal axis is substantially in the shape of a parabola.

5. The end mill according to claim 4, wherein:
said plurality of cutting edges and said plurality of flutes of said first cutting section comprise four cutting edges and four flutes, respectively;
said plurality of cutting edges and said plurality of flutes of said second cutting section comprise two cutting edges and two flutes, respectively;
the length of said first cutting section and the length of said second cutting section are substantially equal;
said flutes in each of said first and second cutting sections comprise helical flutes; and
the length of said second cutting section is greater than the length of said first cutting section.

6. An end mill comprising:
a shank portion being configured to be gripped in a tool;
a cutting portion having a central longitudinal axis;
said cutting portion comprising:
a central core portion;
a first cutting section being configured to perform a finishing machining;
said first cutting section being connected to said shank portion;
said first cutting section comprising:
a plurality of cutting edges being disposed to project from said central core portion; and
a plurality of flutes disposed adjacent their corresponding cutting edges;
a second cutting section being configured to perform a rough machining;
said second cutting section being connected to said first cutting section;
said first cutting section being disposed between said shank portion and said second cutting section along the central longitudinal axis;
said second cutting section comprising:
a plurality of cutting edges being disposed to project from said central core portion; and
a plurality of flutes disposed adjacent their corresponding cutting edge portions;
each of said plurality of cutting edges of said first cutting section being disposed a first distance from said central longitudinal axis;
each of said plurality of cutting edges of said second cutting section being disposed a second distance from said central longitudinal axis;
said first distance being greater than said second distance;
said flutes in said second cutting section having a total cross-sectional area being sufficiently large to permit removal of chips during rough machining;
said flutes in said first cutting section having a total cross-sectional area being sufficiently large to permit removal of chips during finishing machining; and
the total cross-sectional area of said flutes in said second cutting section being substantially greater than the total cross-sectional area of said flutes in said first cutting section.

7. The end mill according to claim 6, wherein said central core portion and said cutting edges of said first cutting edge portion are configured to provide said first cutting edge portion with a greater rigidity than said second cutting edge portion.

8. The end mill according to claim 7, wherein said first cutting section has double the number of cutting edges and corresponding flutes than said second cutting section.

9. The end mill according to claim 8, wherein:
said cutting portion comprises a first end adjacent said shank portion and a second end opposite said first end; and
the diameter of said central core portion decreases along the central longitudinal axis from said first end to said second end.

10. The end mill according to claim 9, wherein:
the cross-sectional profile of said central core portion along the central longitudinal axis is substantially in the shape of a parabola;

said plurality of cutting edges and said plurality of flutes of said first cutting section comprise four cutting edges and four flutes, respectively;

said plurality of cutting edges and said plurality of flutes of said second cutting section comprise two cutting edges and two flutes, respectively;

the length of said first cutting section and the length of said second cutting section are substantially equal;

said flutes in each of said first and second cutting sections comprise helical flutes; and the length of said second cutting section is greater than the length of said first cutting section.

11. An end mill comprising:

a shank portion being configured to be gripped in a tool;

a cutting portion having a central longitudinal axis;

said cutting portion comprising:
 a central core portion;
 a first cutting section being configured to perform a finishing machining;
 said first cutting section being connected to said shank portion;
 said first cutting section comprising:
  a plurality of cutting edges being disposed to project from said central core portion; and
  a plurality of flutes disposed adjacent their corresponding cutting edges;
 a second cutting section being configured to perform a rough machining;
 said second cutting section being connected to said first cutting section;
 said first cutting section being disposed between said shank portion and said second cutting section along the central longitudinal axis;
 said second cutting section comprising:
  a plurality of cutting edges being disposed to project from said central core portion; and
  a plurality of flutes disposed adjacent their
  corresponding cutting edge portions;
 each of said plurality of cutting edges of said first cutting section being disposed a first distance from said central longitudinal axis;
 each of said plurality of cutting edges of said second cutting section being disposed a second distance from said central longitudinal axis; and
 said first distance being greater than said second distance.

12. The end mill according to claim 11, wherein said first cutting section has a larger number of cutting edges and flutes than said second cutting section.

13. The end mill according to claim 12, wherein said central core portion and said cutting edges of said first cutting edge portion are configured to provide said first cutting edge portion with a greater rigidity than said second cutting edge portion.

14. The end mill according to claim 13, wherein said first cutting section has double the number of cutting edges and corresponding flutes than said second cutting section.

15. The end mill according to claim 14, wherein:

said cutting portion comprises a first end adjacent said shank portion and a second end opposite said first end; and the diameter of said central core portion decreases along the central longitudinal axis from said first end to said second end.

16. The end mill according to claim 15, wherein:

the cross-sectional profile of said central core portion along the central longitudinal axis is substantially in the shape of a parabola;

said plurality of cutting edges and said plurality of flutes of said first cutting section comprise four cutting edges and four flutes, respectively;

said plurality of cutting edges and said plurality of flutes of said second cutting section comprise two cutting edges and two flutes, respectively;

said flutes in each of said first and second cutting sections comprise helical flutes; and the length of said second cutting section is greater than the length of said first cutting section.

17. The end mill according to claim 11, wherein:

said plurality of cutting edges of said first cutting section are configured to cut metal comprising at least one of: stainless steel, high temperature alloys, Inconel, and Rene; and said plurality of cutting edges of said second cutting section are configured to cut metal comprising at least one of: stainless steel, high temperature alloys, Inconel, and Rene.

18. The end mill according to claim 17, wherein said central core portion and said cutting edges of said first cutting edge portion are configured to provide said first cutting edge portion with a greater rigidity than said second cutting edge portion.

19. The end mill according to claim 18, wherein:

said first cutting section has double the number of cutting edges and corresponding flutes than said second cutting section;

said cutting portion comprises a first end adjacent said shank portion and a second end opposite said first end; and the diameter of said central core portion decreases along the central longitudinal axis from said first end to said second end.

20. The end mill according to claim 19, wherein:

the cross-sectional profile of said central core portion along the central longitudinal axis is substantially in the shape of a parabola;

said plurality of cutting edges and said plurality of flutes of said first cutting section comprise four cutting edges and four flutes, respectively;

said plurality of cutting edges and said plurality of flutes of said second cutting section comprise two cutting edges and two flutes, respectively;

said flutes in each of said first and second cutting sections comprise helical flutes; and the length of said second cutting section is greater than the length of said first cutting section.

* * * * *